(12) United States Patent
Lautt et al.

(10) Patent No.: US 9,323,735 B2
(45) Date of Patent: Apr. 26, 2016

(54) METHOD AND APPARATUS FOR SPREADSHEET AUTOMATION

(75) Inventors: Robert Lautt, Piedmont, CA (US); Zoltan Grose, Hercules, CA (US)

(73) Assignee: A3 SOLUTIONS INC., San Francisco, CA (US)

( * ) Notice: Subject to any disclaimer, the term of this patent is extended or adjusted under 35 U.S.C. 154(b) by 1088 days.

(21) Appl. No.: 11/146,263

(22) Filed: Jun. 6, 2005

(65) Prior Publication Data

US 2005/0273311 A1 Dec. 8, 2005

Related U.S. Application Data

(60) Provisional application No. 60/578,136, filed on Jun. 8, 2004.

(51) Int. Cl.
*G06F 17/00* (2006.01)
*G06F 17/24* (2006.01)

(52) U.S. Cl.
CPC ................... *G06F 17/246* (2013.01)

(58) Field of Classification Search
CPC ........................ G06F 17/246; G06F 17/2247
USPC ......... 715/503, 504, 506, 517, 212, 213, 209, 715/255; 707/101, 736, 802
See application file for complete search history.

(56) References Cited

U.S. PATENT DOCUMENTS

| | | | |
|---|---|---|---|
| 5,970,490 A * | 10/1999 | Morgenstern | |
| 6,438,565 B1 * | 8/2002 | Ammirato et al. | 715/204 |
| 6,604,110 B1 * | 8/2003 | Savage et al. | 707/602 |
| 6,643,663 B1 * | 11/2003 | Dabney et al. | |
| 6,671,689 B2 * | 12/2003 | Papierniak | |
| 6,684,369 B1 * | 1/2004 | Bernardo et al. | 715/205 |
| 7,225,189 B1 * | 5/2007 | McCormack et al. | |
| 7,483,851 B1 * | 1/2009 | Brixius et al. | 705/37 |
| 7,783,628 B2 * | 8/2010 | Middelfart | 707/722 |
| 8,484,624 B1 * | 7/2013 | Srinivasan et al. | 717/135 |
| 2002/0010743 A1 * | 1/2002 | Ryan et al. | 709/205 |
| 2002/0062385 A1 * | 5/2002 | Dowling | 709/230 |
| 2003/0014557 A1 * | 1/2003 | Berger | G06F 17/3092 719/318 |
| 2003/0154232 A1 * | 8/2003 | Beringer et al. | 709/102 |
| 2003/0163404 A1 * | 8/2003 | Hu et al. | 705/36 |
| 2003/0172343 A1 * | 9/2003 | Leymaster et al. | 715/500 |
| 2003/0212960 A1 * | 11/2003 | Shaughnessy et al. | 715/526 |
| 2004/0111666 A1 * | 6/2004 | Hollcraft | 715/503 |
| 2004/0148214 A1 * | 7/2004 | Aziz et al. | 705/8 |
| 2004/0158799 A1 * | 8/2004 | Breuel | 715/513 |
| 2004/0172446 A1 * | 9/2004 | Dorman et al. | 709/203 |
| 2004/0181378 A1 * | 9/2004 | Gilmore | 703/6 |
| 2005/0039114 A1 * | 2/2005 | Naimat et al. | 715/503 |
| 2005/0071739 A1 * | 3/2005 | Gava | G06Q 40/12 715/234 |
| 2005/0198325 A1 * | 9/2005 | Holland et al. | 709/229 |
| 2005/0234908 A1 * | 10/2005 | Lowrance et al. | 707/8 |
| 2005/0273496 A1 * | 12/2005 | Jean | H04L 12/581 709/206 |
| 2006/0069635 A1 * | 3/2006 | Ram | G06Q 30/08 705/37 |
| 2007/0073625 A1 * | 3/2007 | Shelton | 705/59 |

(Continued)

OTHER PUBLICATIONS

Microsoft Excel (hereinafter Excel), copyright 1999, pp. 1-27.*
Ellen Thro, The Artificial Intelligence Dictionary 227 (1991).*
Random House Unabridged Dictionary, 2nd ed. 519 (1993).*

(Continued)

*Primary Examiner* — Thu Huynh
(74) *Attorney, Agent, or Firm* — Heimlich Law, PC; Alan Heimlich, Esq.

(57) ABSTRACT

A method and apparatus for spreadsheet automation have been disclosed.

7 Claims, 30 Drawing Sheets

(56) References Cited

U.S. PATENT DOCUMENTS

2008/0222041 A1* 9/2008 Mani .............................. 705/51
2008/0282139 A1* 11/2008 Davis ........................... 715/205

OTHER PUBLICATIONS

Microsoft® Computer Dictionary, 5th ed. 336 (2002).*
Microsoft Excel 2000, copyright 1999, pp. 1-27, all.

* cited by examiner

Portal Tools

- Homepage
  - Announcements: Filtered by user group
  - Related Links: Available to all groups
  - My Directory: Filtered by user group
  - My Models: Configured by end users
  - Dashboards: Configured by end users

FIG. 9

Portal Tools

- Tools
  - My Profile
    - Groups & Roles
    - Change Password
  - Spreadsheet add-in
  - Display Output in Browser or Excel
  - Users, Groups, Roles
  - On-line Documentation

FIG. 10

OLAP Cube - Underlying Foundation

- Multiple Dimension Cubes for Display in Two Dimension Worksheets
- Possible Dimensions Include:
  - Time (Month, Year, Quarter)
  - Scenario (Budget, Forecast, Actual)
  - Accounts (Salaries, Postage, Net Income)
  - Organization (Total Company, Cost Center)
  - Adjustment (Adjusted, Unadjusted)

FIG. 11

Repository Tools & Spreadsheet Model Building Process

1. Complete Spreadsheet Specifications Worksheet
2. Create Excel workbook
3. Create Data Sources
4. Create Selections
5. Create Data Ranges
6. Create Spreadsheet Model
7. Create Directory/Catalog
8. Create Folder

Create Excel Workbook

- Report Layout
  – Column Headings, Rows Headings
  – Titles
- Fixed or Dynamic
- Worksheet range name
- Selection Token
- Formulae
- Formats

FIG. 16

Repository Tools

- Data Sources
- User Selections
- Data Ranges
- Spreadsheet Models
- Directory/Catalog
- Folders

FIG. 17

Repository Tools: Data Sources

- OLAP Cube
  - Essbase
  - MSAS OLAP
- Specific Server-Application-Database
- Reusable Objects
- Semi-Transportable

FIG. 18

Repository Tools: User Selections

- Define Selection Parameters
  - Data source identified
  - Customize User Prompts
  - Token Definition
  - Report Scripts (Essbase or MDX)
    - Start Members
    - List Levels
    - Limit Selection to leaf members
- Reusable / Transportable

FIG. 19

Repository Tools: Data Ranges

- Set Data Range Properties
  - Excel range name
  - Fixed or Dynamic
  - Suppress Missing / Zero
  - Subtotaling
  - Text range
  - Data Sources
  - Row & Column Headers
  - Insert Row Properties
- Reusable / Transportable

FIG. 20

Repository Tools: Spreadsheet Models

- Collection Repository Objects
- Set Spreadsheet Properties
  - Gridlines, Scrollbars, tabs
  - Hide Sheets
  - Spreadsheet Instructions
- Associate Excel Workbook
- Associate Data Ranges
- Associate User Selections
- Transportable / Least likely to be reused

FIG. 21

Repository Tools: Directory/Catalog

- Group Folders (which contain Spreadsheets)
- Set user group permissions
- Reusable Objects
- Transportable

FIG. 24

Repository Tools: Folders

- Group Spreadsheets within Folders
- Set user group permissions
- Reusable Objects
- Transportable

FIG. 25

A3 Modeling Training

| | |
|---|---|
| A3 Modeling Help | 2 |
| Getting Started | 3 |
| Overview | 3 |
| Accessing the Portal | 5 |
| Using the Homepage | 6 |
| The A3 Modeling Player | 9 |
| A3 Player Setup | 9 |
| Model Display | 11 |
| Using A3 Modeling | 15 |
| My Directory | 15 |
| Building Models | 17 |
| My Models | 18 |
| Favorites | 19 |
| Using Dashboards | 20 |
| Using Workflow | 22 |
| Using the A3 Player | 25 |
| Working Offline | 31 |
| Portal Tools & Admin | 32 |
| Introduction to Administration | 32 |
| Home Page Administration | 34 |
| Users, Groups, Roles | 37 |
| Object Cache | 40 |
| Servlet Container | 42 |
| Workflow Administration | 43 |
| System Requirements | 47 |
| Repository Tools & Admin | 48 |
| Tools Overview | 48 |
| Common OLAP Gateway | 50 |
| DataRanges | 52 |
| Selections | 58 |
| Templates | 63 |
| VBA Modules | 67 |
| Directory Catalogs | 70 |
| Model Workbooks | 75 |
| Worksheet Reference | 75 |
| Workbook Commands | 88 |
| User Buttons | 89 |
| Tokenized Calc Script | 91 |
| Spreading Setup | 94 |
| Drilldown Show Generation | 96 |
| Flag Values and the Flag Database | 97 |
| Tutorial | 101 |
| Authoring Models | 101 |

FIG. 27

METHOD AND APPARATUS FOR SPREADSHEET AUTOMATION

RELATED APPLICATION

This patent application claims priority of U.S. Application Ser. No. 60/578,136 filed on Jun. 8, 2004, entitled "Method and Apparatus for Spreadsheet Automation", which is by the same inventors as this application and which is hereby incorporated herein by reference.

FIELD OF THE INVENTION

The present invention pertains to spreadsheets. More particularly, the present invention relates to a method and apparatus for spreadsheet automation.

BACKGROUND OF THE INVENTION

Spreadsheets are ubiquitous. They are used by individuals as well as the largest organizations. Spreadsheets, originally designed as personal productivity tools, have become the application of choice for a wide variety of enterprise, department and team processes. Spreadsheets are used throughout enterprises, both large and small, for mission critical forecasting, budgeting, reporting, analysis, etc. They are easy to create, easy to modify and easy to use, however there are possible problems.

For example, consider this scenario: A budget administrator is burdened with bringing together diverse inputs and models from all over the enterprise. Getting the relevant operational data from spreadsheets from manufacturing, sales and marketing into the plan along with expense information from all of the cost center managers is an overwhelming task. Add to this the possibility that the capital plan and the compensation plan may both cross all these functions. This may result in budget administrators spending excessive hours completing this task, fraught with possible errors, and not having enough time for analysis. This presents a problem.

The natural temptation is to blame the spreadsheets for creating this situation; however, the alternative is generally replacing spreadsheets with a pre-packaged application lacking the ability of the spreadsheets in modeling your business. Furthermore, your models, processes and expertise may be built around spreadsheets. The bottom-line is that the loss of visibility, the cost of re-engineering business rules and processes, and re-training people is expensive. This presents a problem.

Spreadsheets, for example, Microsoft Excel were designed for personal productivity and this may lead to problems when being used by workgroups. It may be easy to merge, for example, a sales forecast when a spreadsheet is used by three sales managers. However, when as few as 5 users try to consolidate their information, it can be both cumbersome and trouble-prone. For example, one approach involves emailing spreadsheet workbooks to individuals, then having those workbooks filled out and emailed back, which necessitates manually replacing the original worksheets. Because these operations involve file management, email-based communication, repetitive manual reporting, analysis, and reconciliation, it may be difficult and time-consuming for a process administrator to keep track of who has what version of a file, and to ensure that all changes have been correctly merged. This presents a problem.

Another complaint leveled against the corporate use of spreadsheets is the proliferation of "spreadmarts," (spreadsheet+datamart), that is many individual spreadsheets that contain different snapshots of corporate data. The problem is that while one person's snapshot may be of, for example, the January forecast, another's may be the January budget plus actuals to date. When people try to do analysis based on different snapshots, they have a problem.

When spreadsheet processes become enterprise processes, the administrative burden may become untenable with costs, inaccuracy, and inefficiencies escalating. The integrity of the processes may be at stake. This presents a problem.

Additionally, traditional spreadsheets are not web enabled, which is a benefit in today's connected world. This presents a problem.

BRIEF DESCRIPTION OF THE DRAWINGS

The invention is illustrated by way of example and not limitation in the figures of the accompanying drawings in which:

FIG. 9 illustrates one embodiment of the invention showing a list of portal tools that are available on a homepage;

FIG. 10 illustrates one embodiment of the invention showing a list of portal tools that are available under the heading of tools;

FIG. 11 illustrates one embodiment of the invention showing an OLAP cube, etc.;

FIG. 12 illustrates one embodiment of the invention showing repository tools available;

FIG. 15 illustrates one embodiment of the invention showing a spreadsheet specification in the form of a worksheet;

FIG. 16 illustrates one embodiment of the invention showing items available for creating an Excel workbook;

FIG. 17 illustrates one embodiment of the invention showing repository tools;

FIG. 18 illustrates one embodiment of the invention showing repository tools specific to data sources;

FIG. 19 illustrates one embodiment of the invention showing repository tools specific to user selections;

FIG. 20 illustrates one embodiment of the invention showing repository tools specific to data range;

FIG. 21 illustrates one embodiment of the invention showing repository tools specific to spreadsheet models;

FIG. 24 illustrates one embodiment of the invention showing repository tools specific to directory/catalog;

FIG. 25 illustrates one embodiment of the invention showing repository tools specific to folders;

FIG. 27 is the front page of a spreadsheet automation server training manual for one embodiment of the invention.

DETAILED DESCRIPTION

Figure 1:
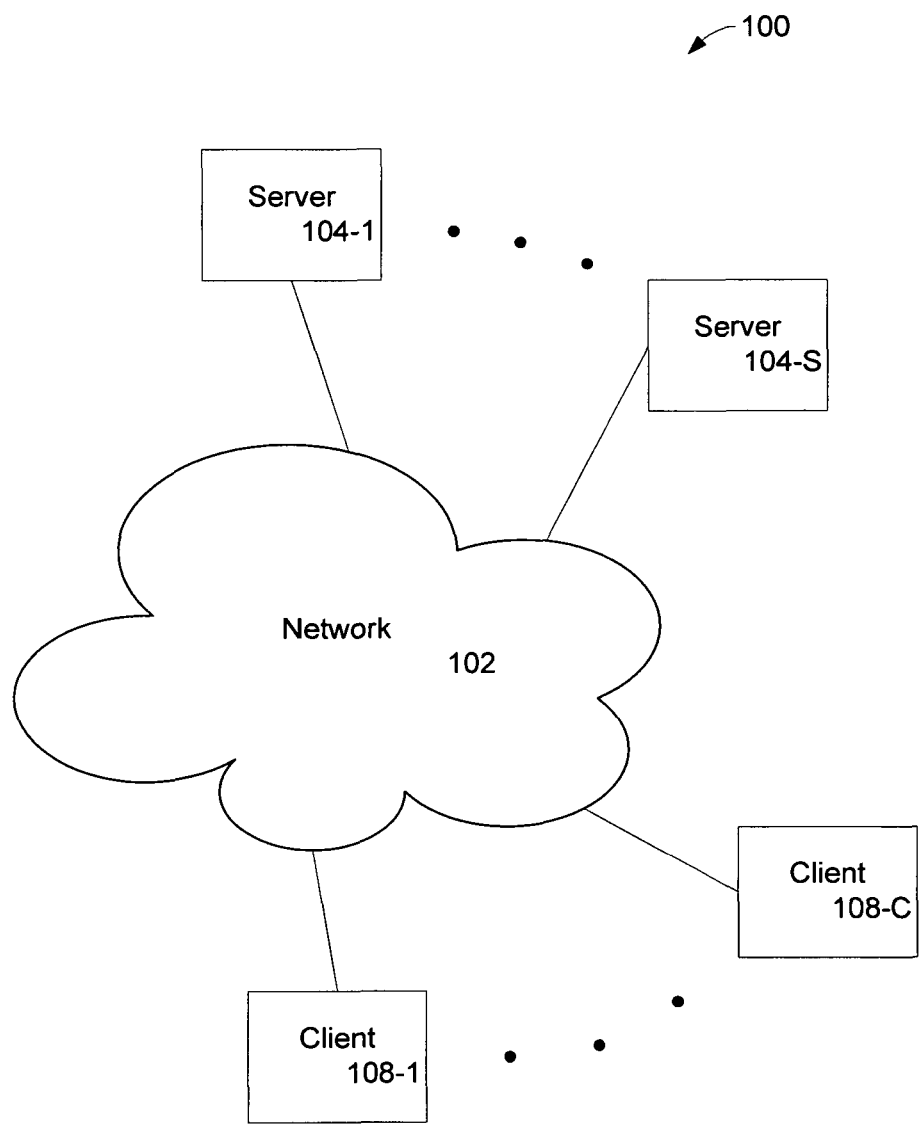
FIG. 1 illustrates a network environment in which the method and apparatus of the invention may be implemented.

Spreadsheet automation is a framework for building efficient spreadsheet processes, while capitalizing on the models, analytics, and expertise that already exist in a user's current spreadsheets. Spreadsheet automation may lead to results of high value, and easy-to-deploy solutions at low total cost, especially when compared to traditional enterprise applications. In one embodiment of the invention, spreadsheet automation provides efficiency via fast, accurate, and automated distribution of data, collection of data, consolidation of data, reporting, and analysis. This may lead to higher integrity, productivity, communications, and better visibility into business issues through real-time analysis.

In one embodiment of the invention, a spreadsheet automation approach wraps a spreadsheet environment, such as Excel, in a shell that handles enterprise-level issues such as deployment, authentication, process-control, and database connectivity.

In one embodiment of the invention, instead of using email as a distribution mechanism, the spreadsheet automation, which is built as a web application, delivers spreadsheets from a central server directly to a user's desktop.

In one embodiment of the invention, a user can retrieve a spreadsheet (also called a spreadsheet model, a template, or a template model), fill out the spreadsheet and submit the changes to the server, with the changes just made automatically available to everyone. And, the data the spreadsheet uses is automatically refreshed when a new spreadsheet is requested from the server. This provides for an up-to-date spreadsheet.

In one embodiment of the invention, content posted to a spreadsheet automation server requires only basic word processing skills and the messaging interface allows the process administrator to customize the messaging for different groups of users.

In one embodiment of the invention, the spreadsheet automation server is built around the concept of automating spreadsheets so that enterprise spreadsheet applications can be built by end users. This allows a company or workgroup to leverage its existing spreadsheet assets and spreadsheet skill set and business/domain knowledge to build enterprise class applications.

In one embodiment of the invention, the spreadsheet automation server is a web based application. In one embodiment of the invention, the spreadsheet automation server functions are on an application server foundation and is built as a set of J2EE (Java 2 Platform, Enterprise Edition) and/or .NET components. Thus, it leverages well-established IT (Information Technology) infrastructure found in today's corporations and integrates easily with some of the most popular application infrastructures (for example, Tomcat, BEA WebLogic, Microsoft Windows Server, Microsoft Internet Information Server (Microsoft IIS), and IBM Websphere).

In one embodiment of the invention, direct support for OLAP (Online Analytical Processing) databases including, for example, Microsoft SQL Server Analysis Services and Hyperion Essbase, as well as relational databases is provided.

In one embodiment of the invention, the spreadsheet model is centrally maintained and deployed, and models are delivered through the http protocol. This allows application administrators to centrally control and update each model's analytics, including for example, conditional rules, formatting, missing items suppressed, dynamic calculations, etc. while allowing tailored and personalized models to be delivered to each user.

One embodiment of the invention has the following components: a spreadsheet automation server, a portal, and an optional spreadsheet add-in (also called a player). The spreadsheet automation server may have various embodiments, for example, one tailored to the use of the web is called a Web Spreadsheet Server (WSS). The spreadsheet automation server is composed of an application server, and Java/J2EE and/or .NET components that aid in the construction of spreadsheet-based analytic applications. These components can parse XLS (Excel spreadsheet) templates, and dynamically fill them with data according to the business rules incorporated into the templates. They render the populated XLS models into either real-time XLS files delivered directly to Excel or to HTML web pages. The portal may serve as the web-based interface to the spreadsheet automation server. It allows users to select applications, to choose the model parameters to display and to dynamically generate these applications. The spreadsheet add-in is for users who require advanced spreadsheet functionality, and establishes a direct connection between, for example, Excel and the spreadsheet automation server. The spreadsheet add-in is delivered to the user's machine via the portal. Download of the spreadsheet add-in may be automatic, and thus would require no administrative access (and therefore no IT support) to the desktop.

Figure 3:
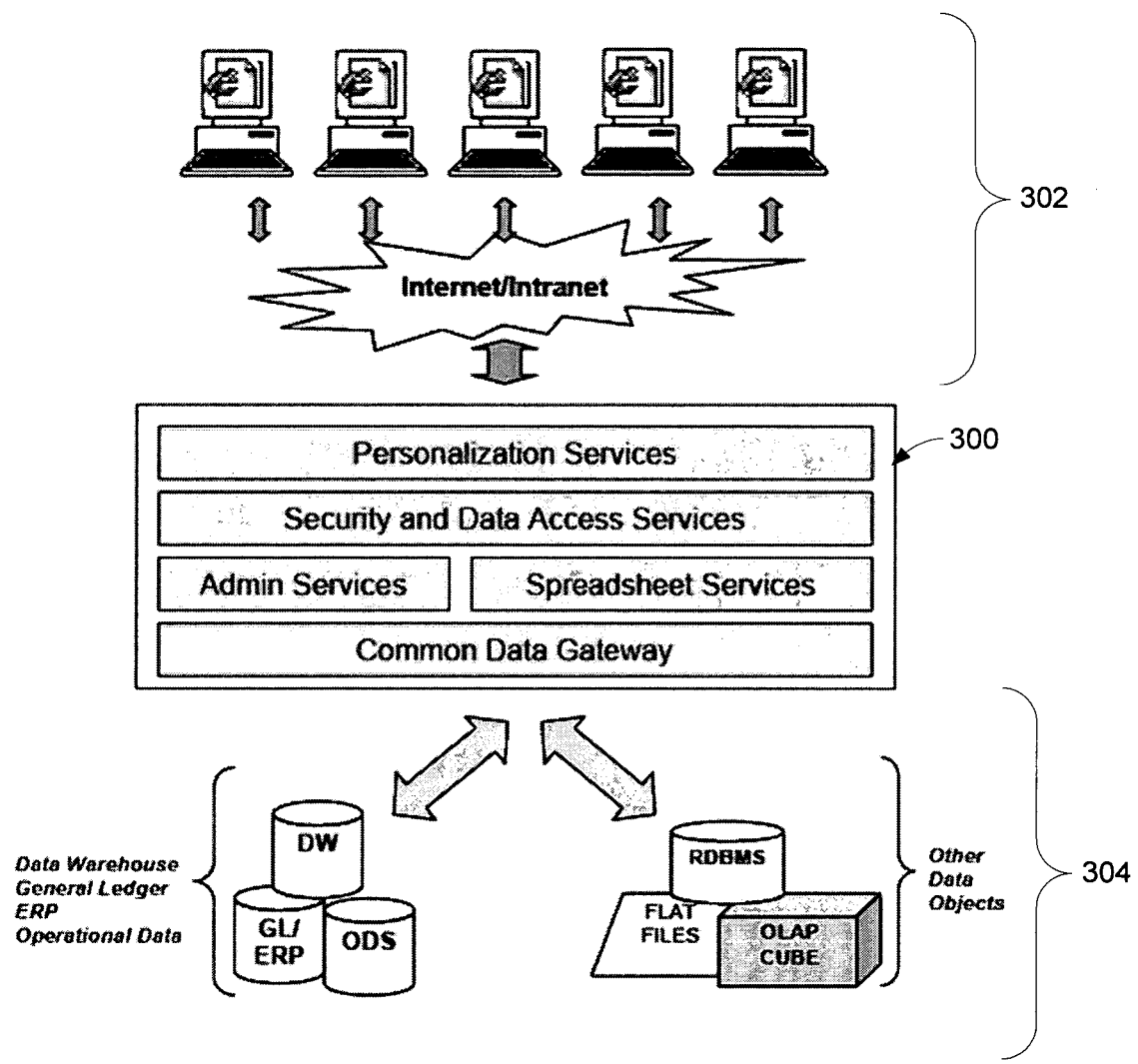
FIG. 3 illustrates one embodiment of the invention showing a web spreadsheet server.

FIG. 3 illustrates one embodiment of the invention 300. At 300 is the spreadsheet automation server which has APIs (Application Programming Interfaces) that may be used to access various web services, or build data specific formulas for spreadsheets. 302 is a communication between the spreadsheet automation server and the users as represented by the computer terminals. 304 shows the spreadsheet automation server communicating with other systems as well as databases and data objects.

In one embodiment of the invention, the portal includes an area for announcements, for related links, and discussion boards.

In one embodiment of the invention, the spreadsheet automation server has pre-built modules, such as capital modeling, and compensation modeling.

Figure 4:
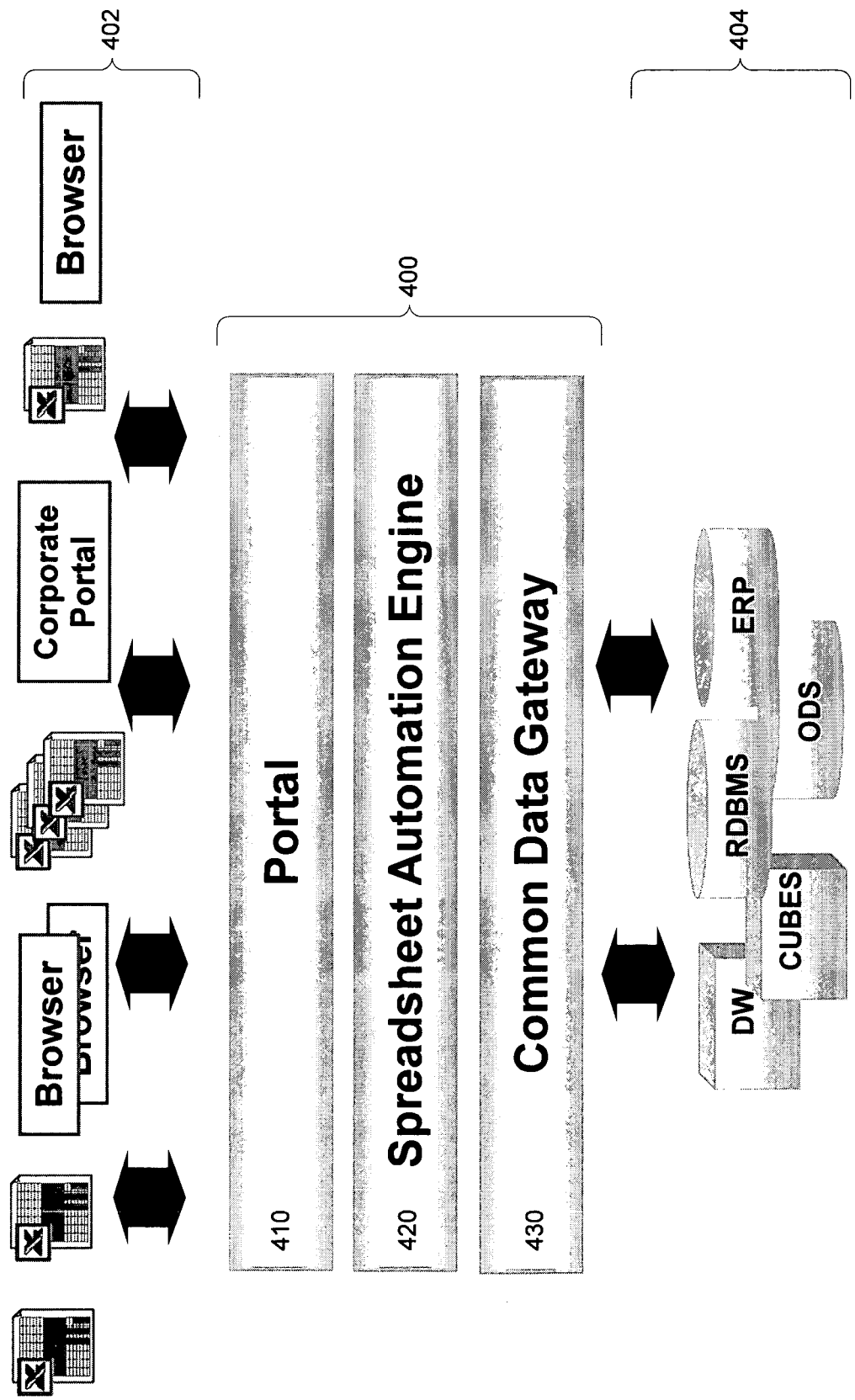
FIG. 4 and FIG. 5 illustrate embodiments of the invention showing a spreadsheet automation server.

FIG. 4 illustrates one embodiment of the invention 400 showing a spreadsheet automation server. At 400 is the spreadsheet automation server, which has a Portal 410, a Spreadsheet Automation Engine 420, and Common Data Gateway 430. 402 is a communication between the spreadsheet automation server and the users as represented by the browser and a corporate portal 410. 404 shows the spreadsheet automation server (through the common data gateway 430) communicating with databases.

Figure 5:
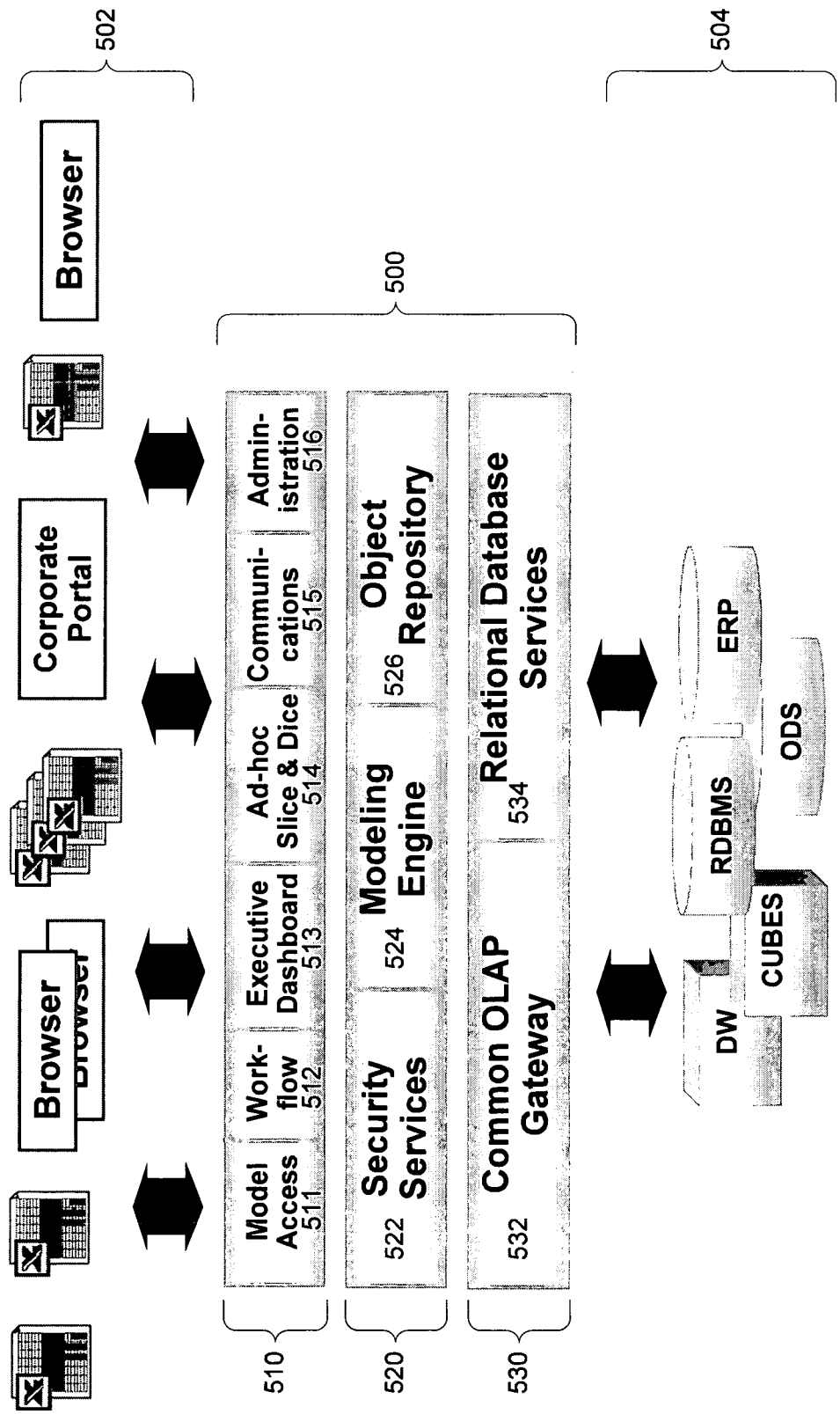

FIG. 5 illustrates one embodiment of the invention 500 showing a spreadsheet automation server. At 500 is the spreadsheet automation server having a portal 510, a spreadsheet engine 520, and a data gateway 530. 502 is a communication between the spreadsheet automation server 500 and the users as represented by the browser and a portal 510. 504 shows the spreadsheet automation server 500 communicating with databases.

The portal 510 has, in this embodiment, a variety of functions that may be accessed by users. For example, model access 511, workflow 512, an executive dashboard 513, an ad-hoc slice and dice 514, communications 515, and administration 516.

The spreadsheet engine 520 has, in this embodiment, security services 522, a modeling engine 524, and an object repository 526.

The data gateway 530 has, in this embodiment, a common OLAP gateway 532, and relational database services 534.

Figure 6:
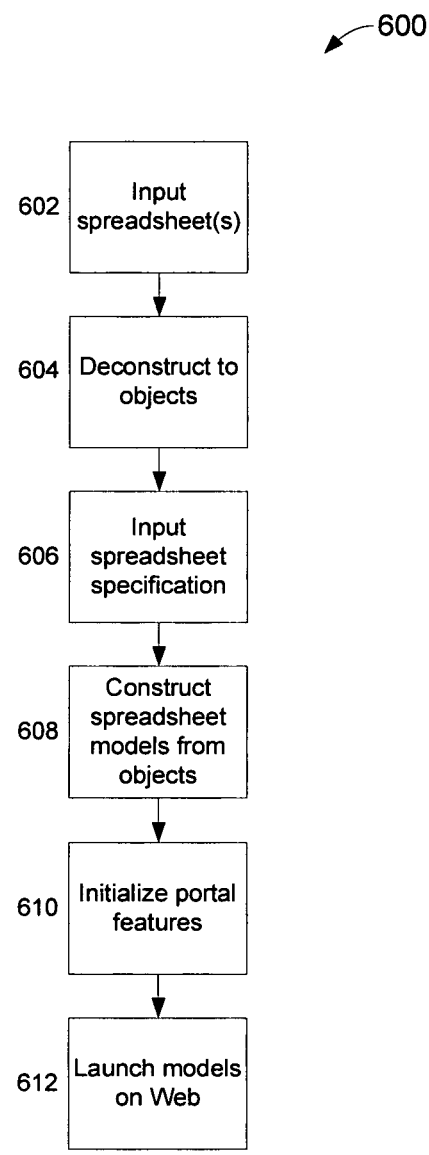
FIG. 6 illustrates one embodiment of the invention in flow chart form.

FIG. 6 illustrates one embodiment of the invention 600 in flow chart form. At 602 one or more spreadsheets are input. At 604 the spreadsheets are deconstructed into objects. At 606 a spreadsheet specification is input, at 608 spreadsheet models are constructed for the objects (based on the specification 606), at 610 the portal features are initialized, and at 612 the models are launched on the web.

Figure 7:
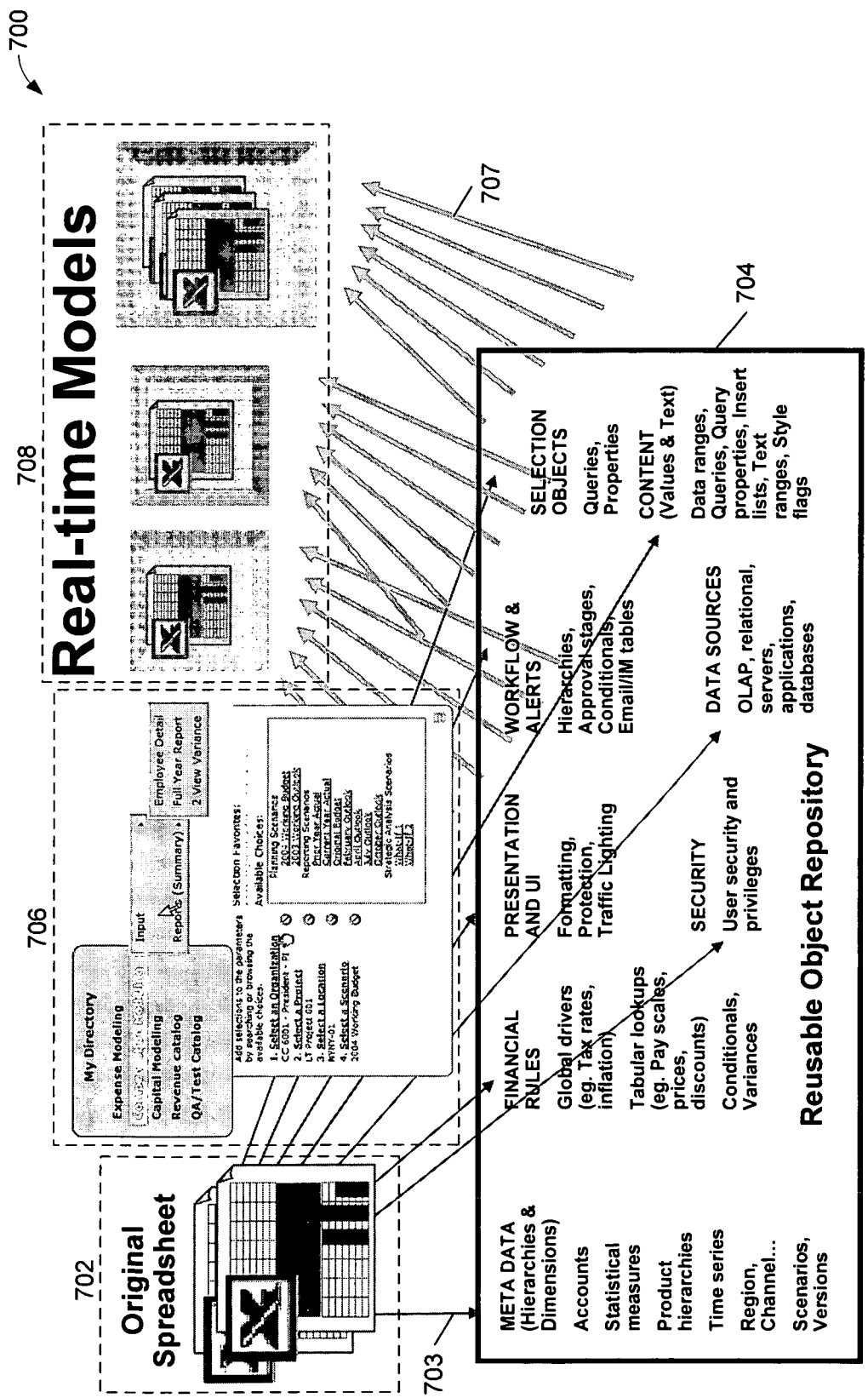
FIG. 7 illustrates one embodiment of the invention 700 showing in more detail interaction of components.

FIG. 7 illustrates one embodiment of the invention 700 showing in more detail how metadata, rules, presentation, security, etc. may interact. At 702 are one or more spreadsheets with information and structure. The information in these spreadsheets is deconstructed shown by arrows such as that denoted at 703 into a variety of data and rules as shown at 704. Based on a user selection of a spreadsheet desired, as denoted by selections shown at 706, information, rules, and additional features, such as alerts, etc. are pulled together, as denoted by arrows such as 707 to construct real-time models 708. Note that the reusable object repository 704 provides reusable spreadsheet objects. Additionally, information may be retrieved not only from that derived from the original spreadsheets but also from other spreadsheets that may have information in the object repository as well as other data sources, such as corporate or web-based databases, Spreadsheet automation works with one or more spreadsheets and leverages the existing spreadsheet assets, keeps the spreadsheet experience, and adds enterprise class features. It is adaptable because as the spreadsheets change the models and enterprise class features allow these to be used by all users. Since the changes may be implemented gradually, this may lead to better adaptability, lowered costs, decreased errors, and increased return on investment, etc.

The invention in one embodiment constructs XLS (Excel spreadsheet) models on-demand in a web environment. This involves deconstruction and reconstruction, use of spreadsheet specification, and a web spreadsheet engine.

In one embodiment of the invention, support is provided for communication with heterogeneous data sources. In one embodiment, a reusable catalog of objects, such as, business and application objects is an available resource. In one embodiment of the invention, integrated views and models are possible as are complex derived information.

Figure 8:
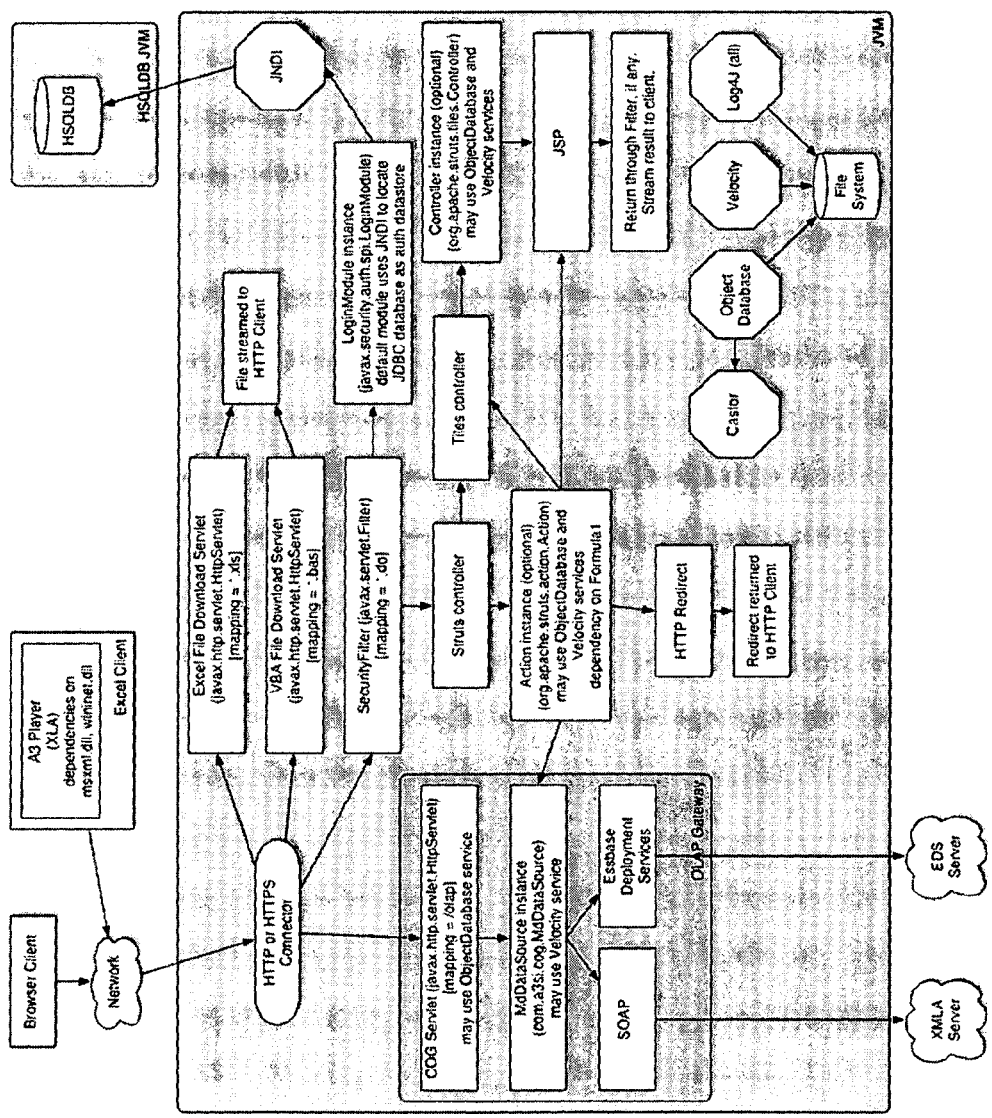
FIG. 8 illustrates one embodiment of the invention 800 showing a spreadsheet automation server architecture.

FIG. 8 illustrates one embodiment of the invention 800 showing a spreadsheet automation server architecture.

FIG. 9 illustrates one embodiment of the invention showing a list of portal tools that are available on a homepage. For example, announcements that may be filtered by user group; related links that may be available to all groups; a user's own directory (my directory) filtered by user group; a user's own models (my models) configured by end users; and dashboards that may be configured by end users.

FIG. 10 illustrates one embodiment of the invention showing a list of portal tools that are available under the heading of tools. For example, a user's profile (my profile) having groups and roles and the ability to change a password. There is also access to a modeling player (also called a spreadsheet add-in), displaying the output in a browser or Excel, manipulating users, groups, and roles and on-line documentation.

FIG. 11 illustrates one embodiment of the invention showing an OLAP cube and some of the features underlying the foundation. Multiple dimension cubes may be used for display in two dimensional worksheets. For example, possible dimensions include, but are not limited to: time (month, quarter, year); various possible scenarios such as budget, forecast, and actual; various accounts such as salaries, postage, shipping, net income; organizational perspective such as total company or a cost center; and adjustments such as adjusted and unadjusted.

FIG. 12 illustrates one embodiment of the invention showing repository tools available and an example spreadsheet model building process. For example, in one embodiment, the first item is to complete a spreadsheet specification worksheet, second an Excel workbook is created, third data sources are created, fourth selections are created, fifth data ranges are created, sixth spreadsheet model(s) are created, seventh a directory and/or catalog is created; and eighth a folder is created.

Figure 13:
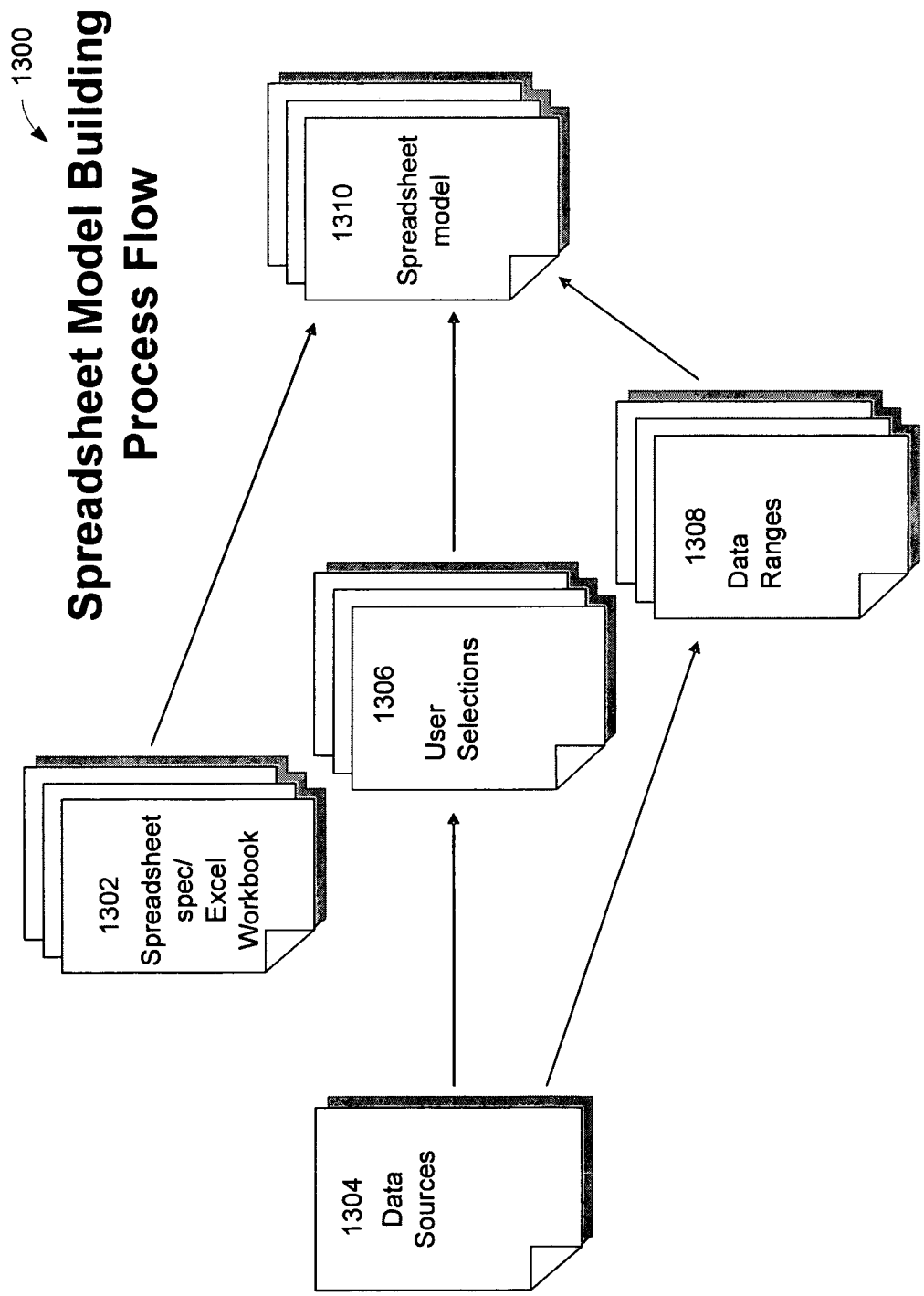
FIG. 13 illustrates one embodiment of the invention showing a spreadsheet model building process flow.

FIG. 13 illustrates one embodiment of the invention showing a model building process flow 1300. At 1302 is a spreadsheet specification which may take the form of an Excel workbook. At 1304 are data sources. At 1306 the user selections from the data sources 1304 are made. At 1308, applicable data ranges are chosen from the data sources 1304, and at 1310 the model (also called a spreadsheet or spreadsheet model) uses the spec 1302 the user selections 1306, and the data ranges 1308.

Figure 14:
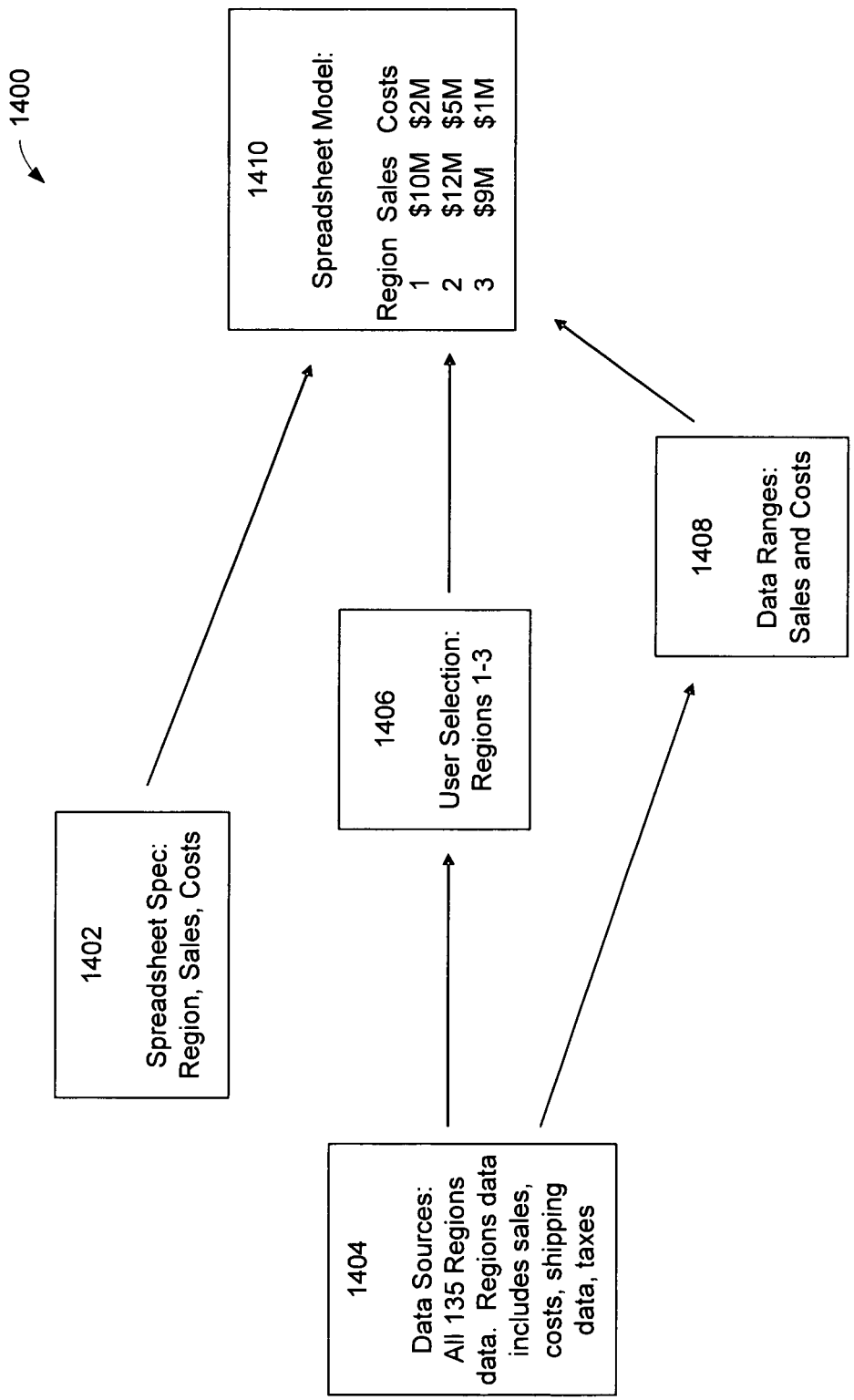
FIG. 14 illustrates a very simplified example using the process flow of FIG. 13.

FIG. 14 illustrates a very simplified example using the process flow of FIG. 13. At 1402 a spreadsheet specification is for a region, that region's sales, and that region's costs. At 1404 the data sources, may consist of, for example, 135 regions with all sorts of data. At 1406 the user selection is for regions 1, 2, and 3. At 1408 the data ranges selected are those of sales and costs only. At 1410 a spreadsheet model is presented, here with some sample data. The spreadsheet model has for each region the corresponding sales and costs. This very simple example is meant to show the process flow, not the limits of embodiments of the invention.

Referring back to FIG. 14, the Data Sources 1404, for the description above were a given data source so as to make the description clear. These data sources and the data that goes with them, for example, the regions and the associated data such as the sales, costs, shipping data, taxes, etc. from each region must somehow be constructed. In one embodiment of the invention (referring back to FIG. 7) a group of original spreadsheets (FIG. 7 at 702) are input into the system and their structure and data is deconstructed into objects (FIG. 7 at 704). For example, in FIG. 14 at 1404 mention was made of 135 Regions. Thus for example, the system 700 may have received 135 different spreadsheets from users in 135 different regions. The spreadsheets were each deconstructed to provide available objects 704 for later reconstruction into real-time models 708 based on a user's spreadsheet specification, such as illustrated in FIG. 14.

What is to be appreciated is that multiple spreadsheets from a variety of sources containing differing fields may be deconstructed, their data made available, and then reconstructed into real-time spreadsheet models. One of skill in the art will appreciate that this technique allows for the use of existing spreadsheets as well as up-to-date data.

Figure 15:
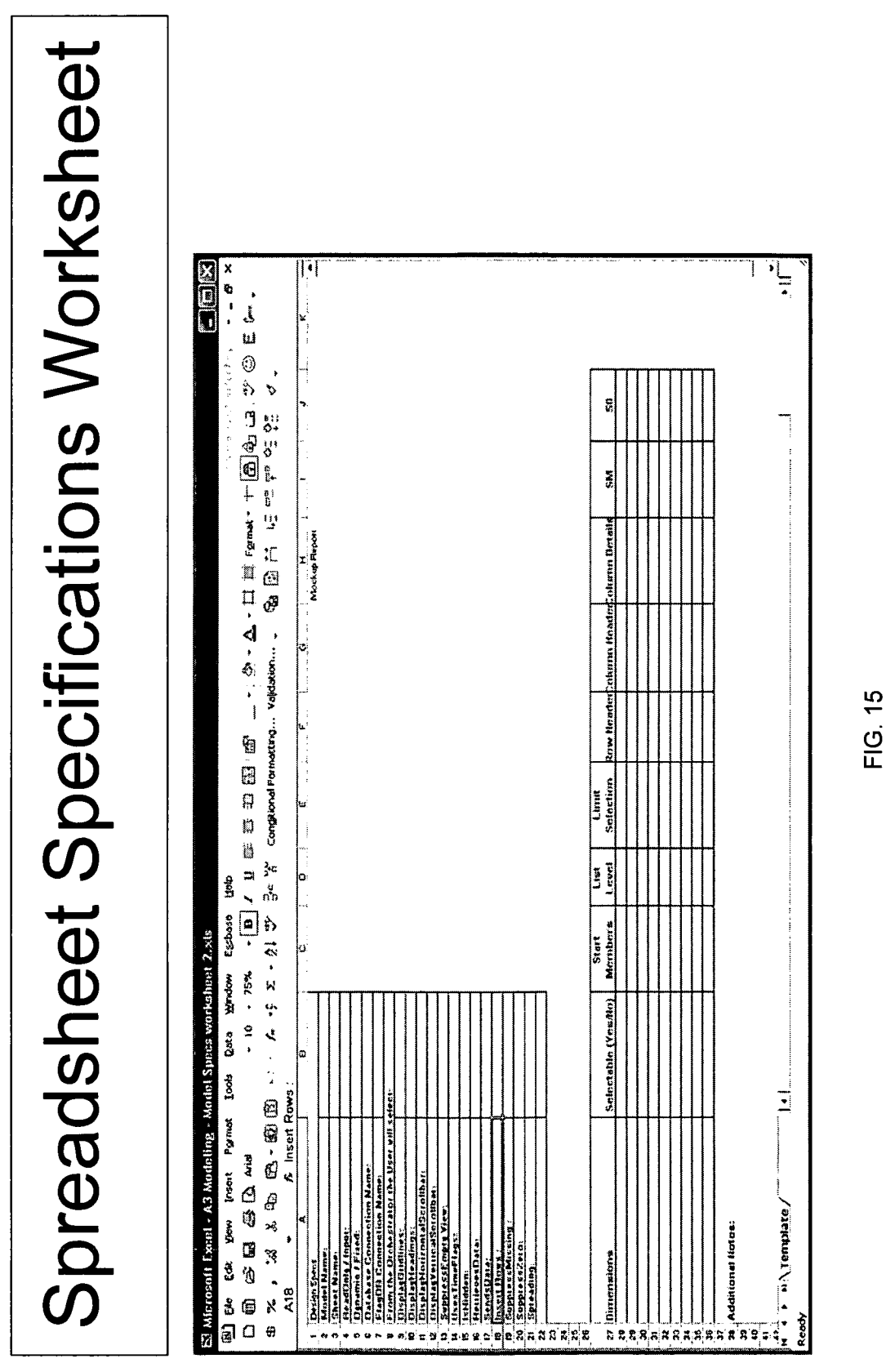

FIG. 15 illustrates one embodiment of the invention showing a spreadsheet specification in the form of a worksheet. In this embodiment, a user may easily enter information and options that allow for the construction of a spreadsheet specification.

FIG. 16 illustrates one embodiment of the invention showing items available for creating an Excel workbook. For example, on the report layout, the column headings, row headings, and titles may be created. Other features may include the option of having the workbook fixed or dynamically updatable, a worksheet range name, selection of tokens, formulas, and formats.

FIG. 17 illustrates one embodiment of the invention showing repository tools. These include, but are not limited to, data sources, user selections, data ranges, spreadsheet models, directory/catalog, and folders.

FIG. 18 illustrates one embodiment of the invention showing repository tools specific to data sources (for example the first item on FIG. 17). Here the tools include an OLAP cube, options being Essbase and MSAS (Microsoft Analysis Services) OLAP. Other data sources are specific server and application databases, reusable objects, and semi-transportable data sources.

FIG. 19 illustrates one embodiment of the invention showing repository tools specific to user selections (for example the second item on FIG. 17). Here the tools include defining the selection parameters (examples of which are listed) as well as reusable/transportable.

FIG. 20 illustrates one embodiment of the invention showing repository tools specific to data ranges (for example the third item on FIG. 17). Here the tools include setting data range properties (examples of which are listed) as well as reusable/transportable.

FIG. 21 illustrates one embodiment of the invention showing repository tools specific to spreadsheet models (for example the fourth item on FIG. 17). Here the tools include a collection of repository objects, a selection for setting spreadsheet properties, associate workbook(s), data ranges, user selections, and transportable or least likely to be reused.

Figure 22:
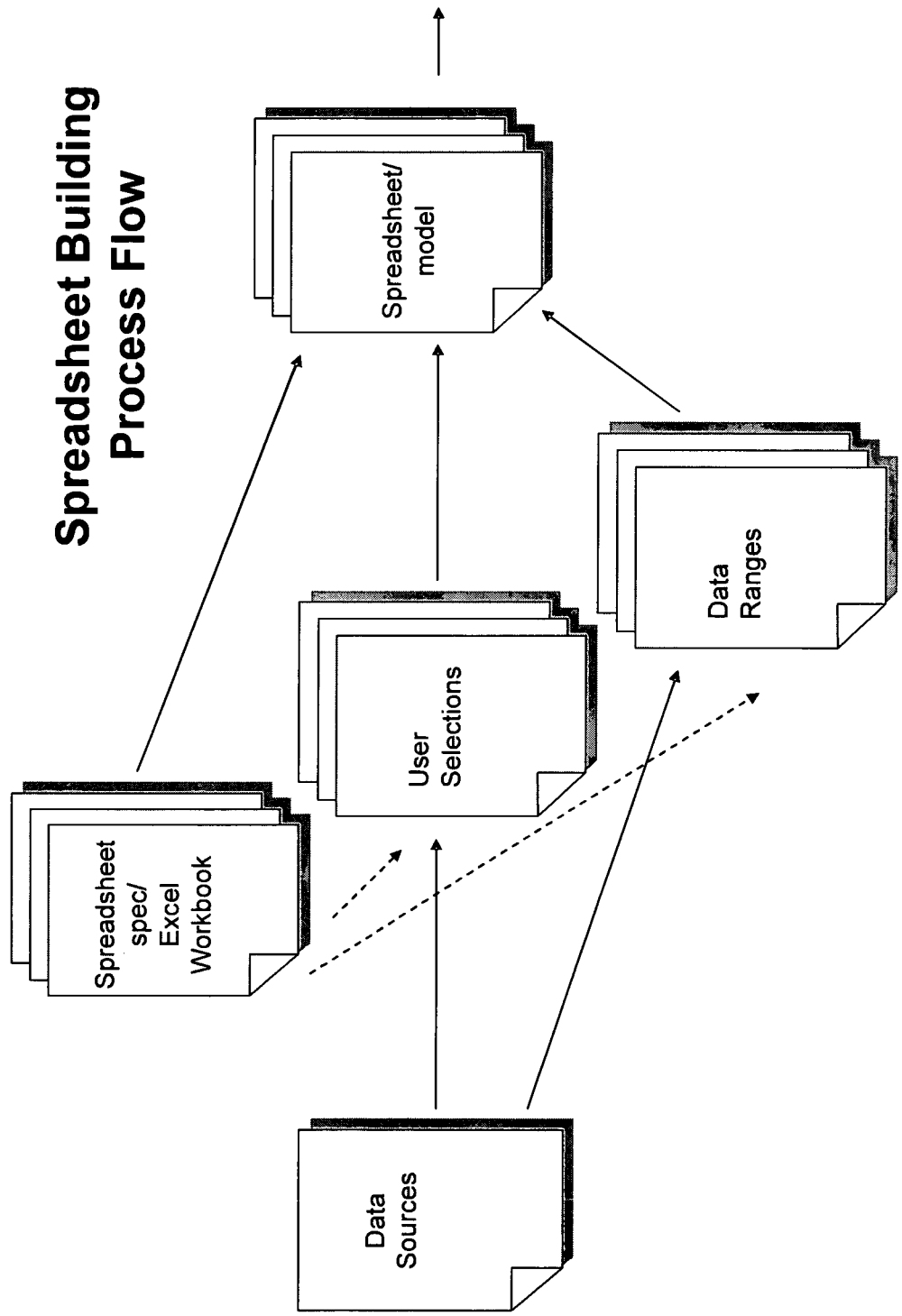
FIG. 22 illustrates one embodiment of the invention showing a spreadsheet building process flow.

FIG. 22 illustrates one embodiment of the invention showing a model building process flow which is somewhat different than that illustrated in FIG. 13. In FIG. 22 the spreadsheet specification which may take the form of an Excel workbook also has influence on the user selections and the data ranges.

Figure 23:
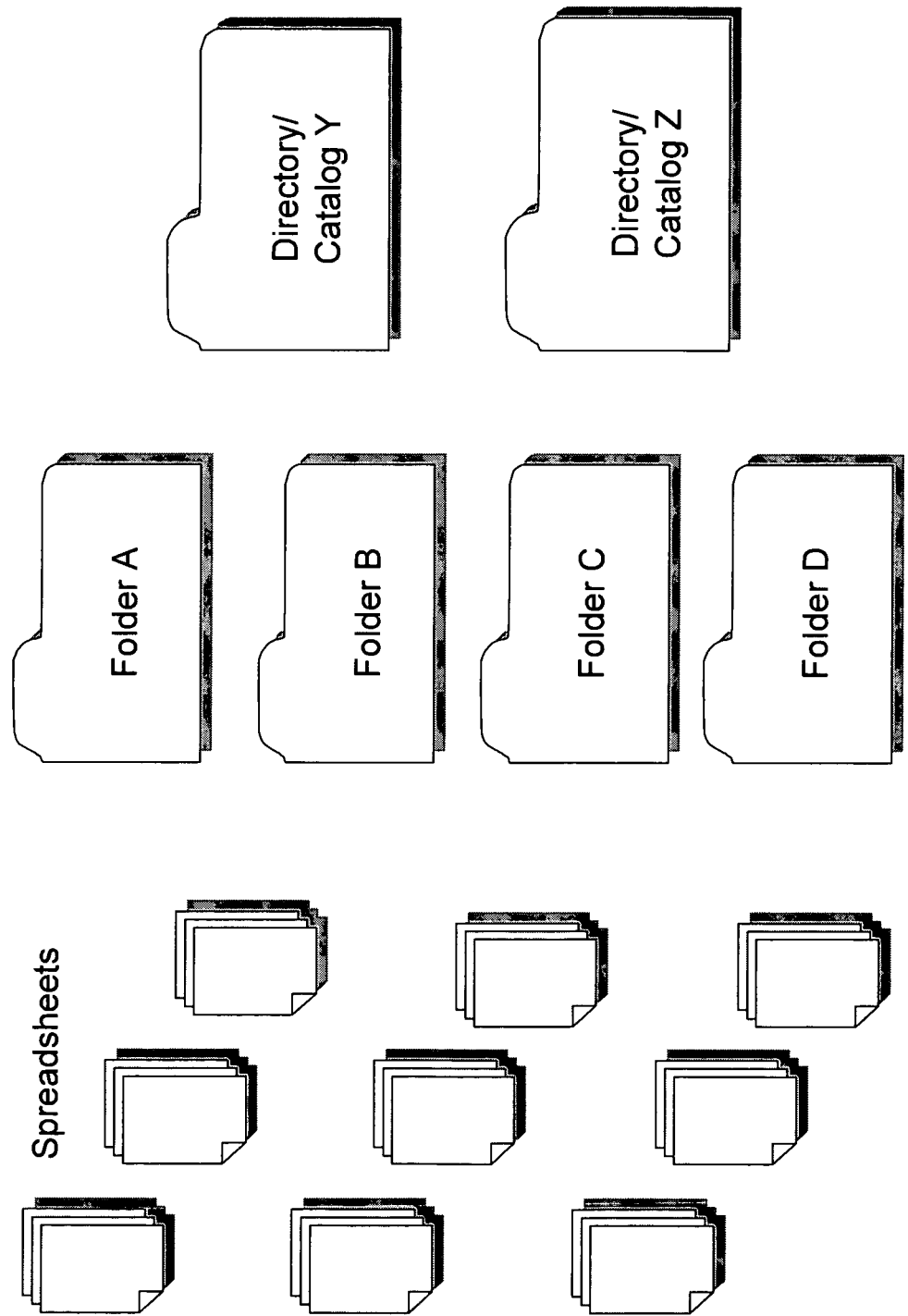
FIG. 23 illustrates one embodiment of the invention showing how spreadsheets may be organized into folders, etc.

FIG. 23 illustrates one embodiment of the invention showing how spreadsheets may be organized into folders (for example, folders A-D), and folders may then be organized into directories and/or catalogs (for example, directory/catalog Y, directory/catalog Z).

FIG. 24 illustrates one embodiment of the invention showing repository tools specific to directory/catalog (for example the fifth item on FIG. 17). Here the tools include grouping folders (which may contain spreadsheets), setting user group permissions, dealing with reusable objects, and transportable features.

FIG. 25 illustrates one embodiment of the invention showing repository tools specific to folders (for example the sixth item on FIG. 17). Here the tools include grouping spreadsheets within folders, setting user group permissions, dealing with reusable objects, and transportable features.

Figure 26:
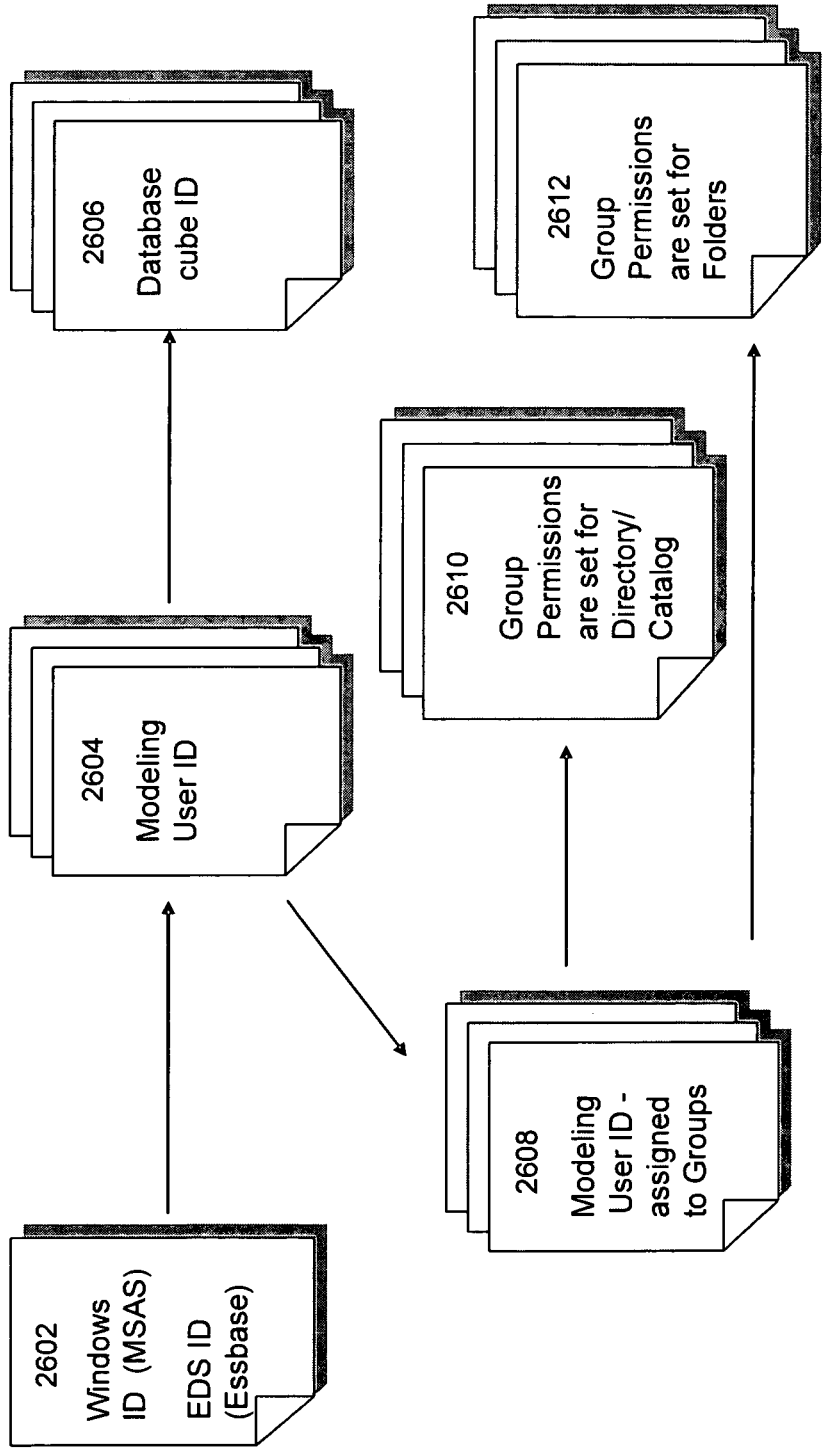
FIG. 26 illustrates one embodiment of the invention showing a modeling permissions summary.

FIG. 26 illustrates one embodiment of the invention showing a modeling permissions summary 2600. Here at 2602 an ID, for example a Windows ID (MSAS) or EDS ID (Essbase) is available to the Modeling User ID 2604. The database cube ID 2606 has available the Modeling User ID 2604. At 2608 the modeling user ID such as that received from 2604 may be assigned to groups 2608. This ID grouping is passed to the group permissions at 2610 and 2612. Based on this ID grouping at 2610 group permissions may be set for a directory/catalog. Based on this ID grouping at 2612 group permissions may be set for folders.

FIG. 27 is the front page of a spreadsheet automation server training manual for one embodiment of the invention. A3 is the name of the company producing the training document. As can be seen by the contents, the spreadsheet automation server has a broad list of capabilities and functions.

Figure 28:
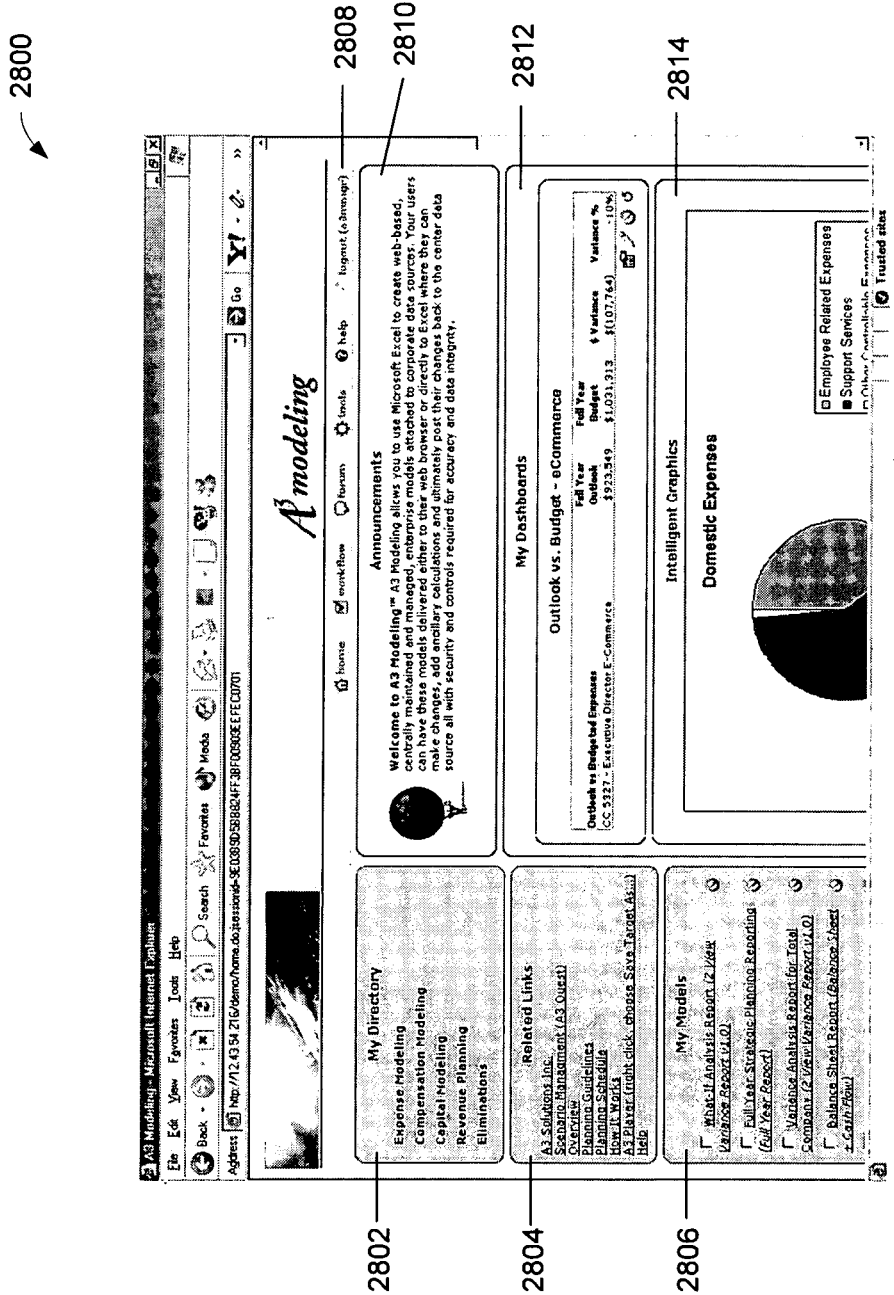
FIG. 28, FIG. 29, and FIG. 30 illustrate embodiments of the invention showing a screen shot.

FIG. 28 illustrates one embodiment of the invention 2800 showing a screen shot. At 2802 is a panel with My Directory choices. At 2804 are Related Links, at 2806 are My Models that a user may have selected in the past and decided to have readily available. At 2808 is a menu bar showing that the workflow is checked. At 2810 is Announcements. At 2812 is My Dashboards and 2814 is a presentation widow showing Domestic Expenses.

Figure 29:
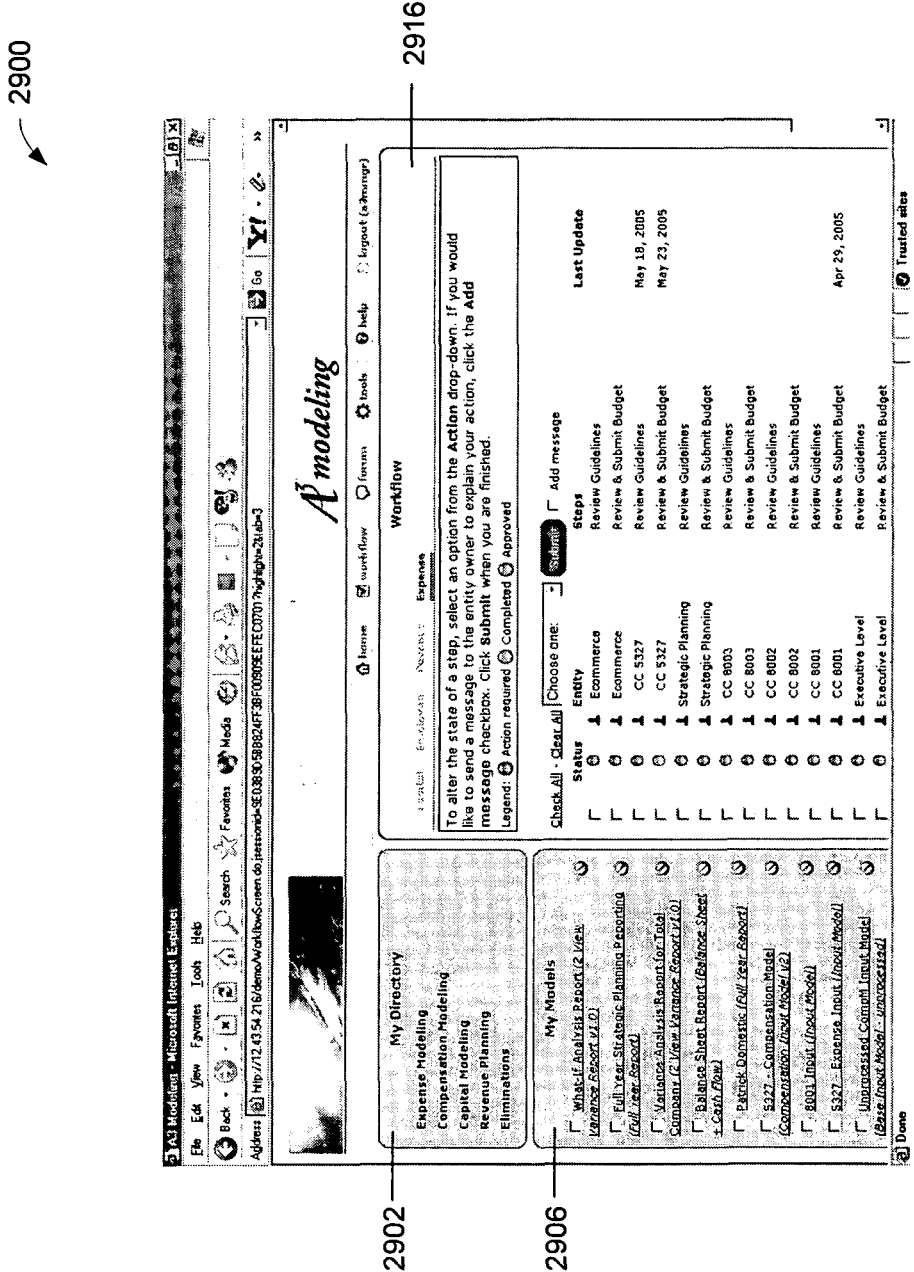

FIG. 29 illustrates one embodiment of the invention 2900 showing a screen shot. At 2902 is a panel with My Directory choices. At 2906 are My Models that a user may have selected in the past and decided to have readily available. At 2916 is a Workflow panel showing options.

Figure 30:
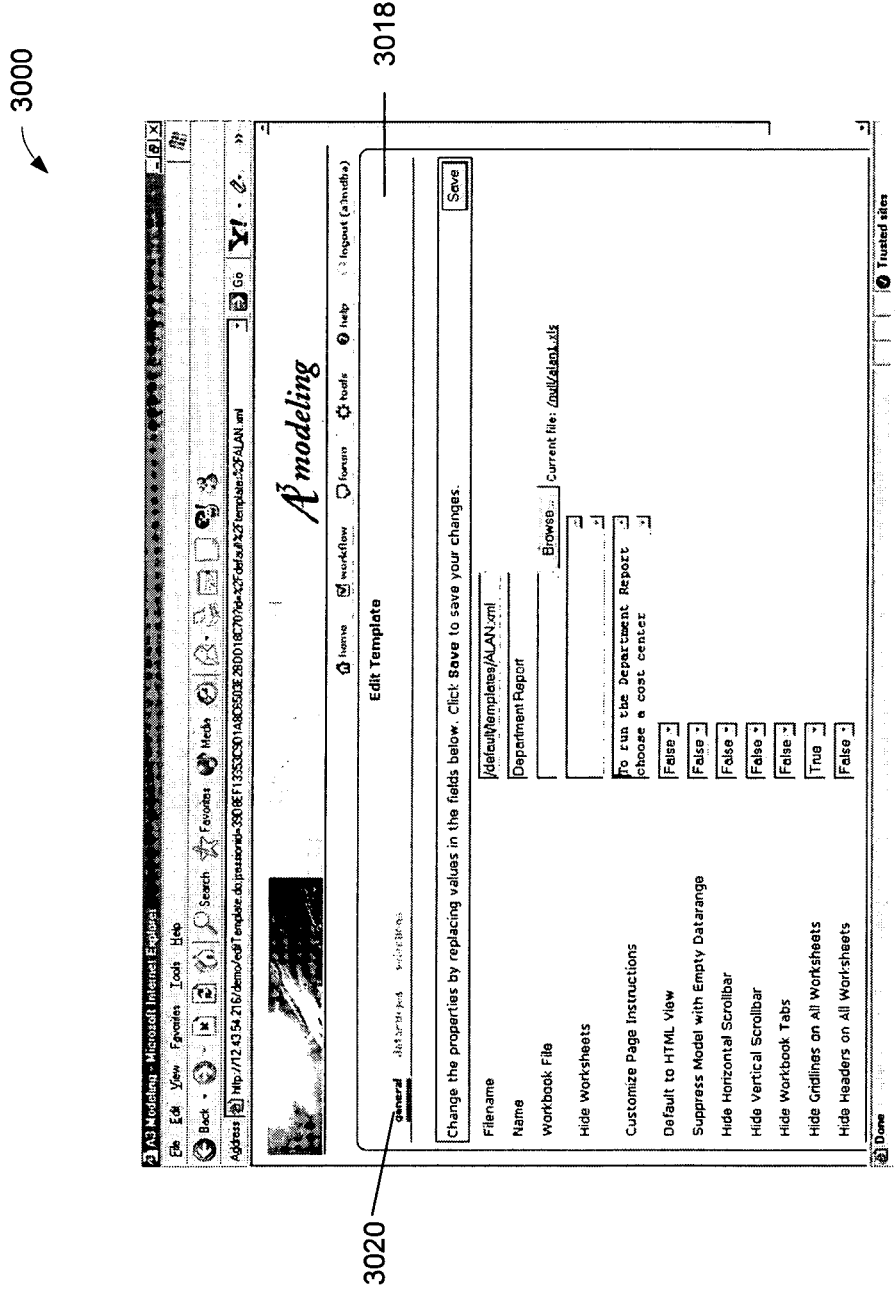

FIG. 30 illustrates one embodiment of the invention 3000 showing a screen shot. At 3018 is a panel Edit Template, allowing a user to edit general properties 3020. Other options shown but not selected are dataranges, and selections (to the right of 3020).

One of skill in the art will appreciate that by using a spreadsheet language, tokens, ranges, and spreadsheet contents, etc. and coupled with corporate metadata it is possible to make available dynamically spreadsheet models that may otherwise be delivered as static spreadsheets. Web enabling this spreadsheet automation allows for organizational controls, tracking, security, etc. otherwise not possible in spreadsheet applications. Additionally, the architecture for the spreadsheet may be on a server and/or a client. These capabilities coupled with the ability to reuse objects provides an extensible environment for spreadsheet automation.

Thus a method and apparatus for spreadsheet automation have been described.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
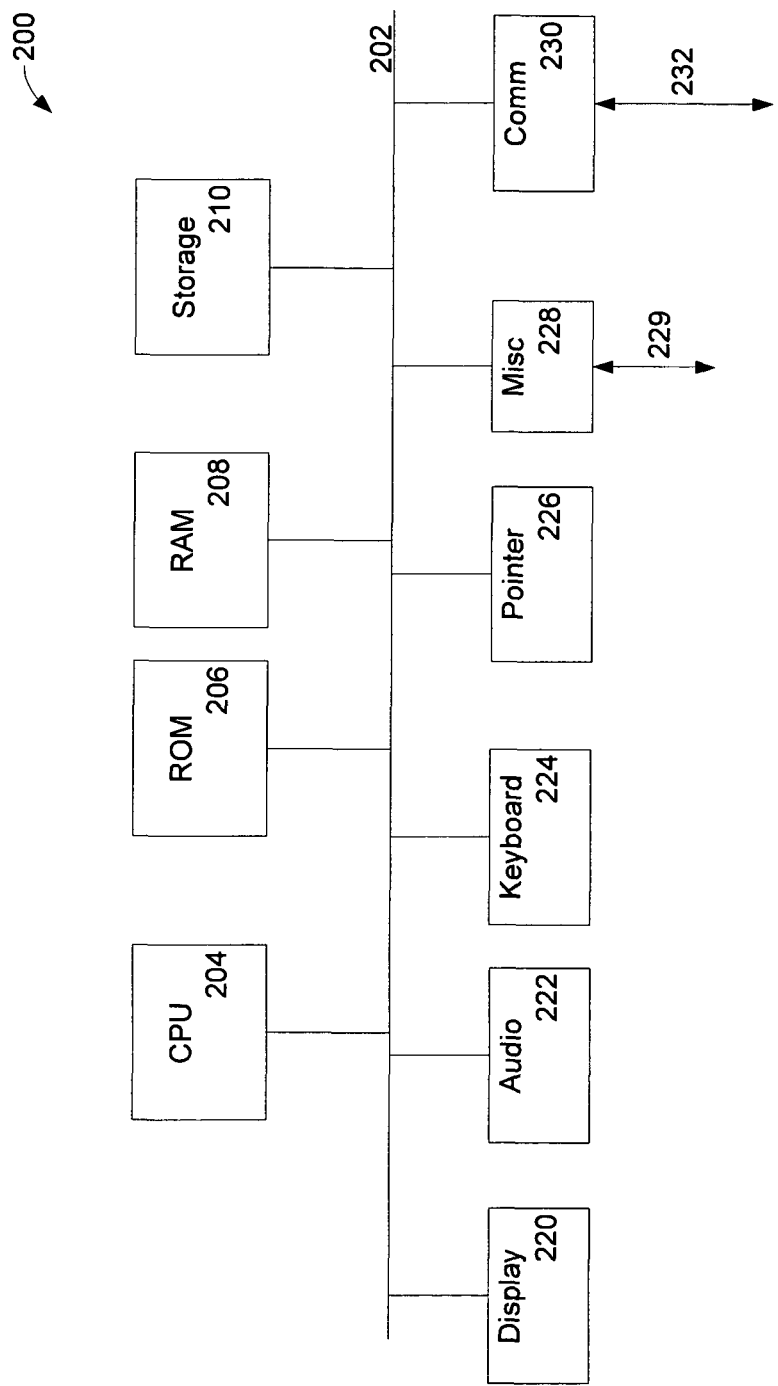
FIG. 2 is a block diagram of a computer system in which some embodiments of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk—read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "Excel" which is a Microsoft spreadsheet product, is not intended to limit the invention. Rather Excel is a very common spreadsheet and any such reference to Excel is to be understood to refer to any class of spreadsheet products.

As used in this description, "spreadsheet specification" or "spreadsheet model specification" or "model specification" all refer to the same entity, that is a specification that defines a spreadsheet. As used in this description, "spreadsheet" or "spreadsheet model" or "model" or "template" or similar terms all refer to a spreadsheet which a user may use. For example, in FIG. 5 at 511 is a portal model access. This "model" is to a spreadsheet and not to the spreadsheet specification (which may have been used to construct it).

Thus a method and apparatus for spreadsheet automation have been described.

What is claimed is:

1. A method comprising:
   inputting two or more preexisting spreadsheets, wherein each of said two or more preexisting spreadsheets is a separate unitary file, and wherein said two or more preexisting spreadsheets contain one or more differing fields;
   extracting from said two or more preexisting spreadsheets each in said separate unitary file into a plurality of metadata, a plurality of financial rules, a plurality of presentations, a plurality of workflow, a plurality of data sources, a plurality of selection objects, and a plurality of content;
   storing said plurality of metadata, said plurality of financial rules, said plurality of presentations, said plurality of workflow, said plurality of data sources, said plurality of selection objects, and said plurality of content in a reusable object repository;
   inputting a user selection that defines a new spreadsheet;
   using said user selection that defines said new spreadsheet and predetermined administrative rules and privileges for said user to construct from said reusable object repository said new spreadsheet; and
   displaying said new spreadsheet for a user on a screen, said screen having a model selection option and said screen having a workflow status panel, said workflow status panel displayed separate from said model selection option and said workflow status panel displaying one or more workflow status options wherein said one or more workflow status options are displayed in a list format and wherein next to each of said one or more workflow status options is a user selectable checkbox.

2. The method of claim 1 wherein said administrative rules and privileges for said user further comprises one or more alerts.

3. The method of claim 1 further on said model selection option a true or false choice for hiding gridlines on all worksheets in said new spreadsheet.

4. The method of claim 3 wherein constructing said new spreadsheet further comprises accessing one or more OLAP cube databases before constructing said new spreadsheet.

5. The method of claim 3 further comprising adding to said-a specification that defines said new spreadsheet instructions.

6. The method of claim 3 further comprising adding to said-a specification that defines said new spreadsheet accessibility based on a user's group.

7. The method of claim 3 wherein constructing said new spreadsheet further comprises incorporating into said new spreadsheet statistical models and one or more cell protection rules.

* * * * *

UNITED STATES PATENT AND TRADEMARK OFFICE
CERTIFICATE OF CORRECTION

PATENT NO.        : 9,323,735 B2
APPLICATION NO.   : 11/146263
DATED             : April 26, 2016
INVENTOR(S)       : Robert Lautt and Zoltan Grose It is certified that error appears in the above-identified patent and that said Letters Patent is hereby corrected as shown below:

In the Claims

Claim 5, line 2 (Column 12 Line 39)
Change "said-a" to --a--

Claim 6, line 2 (Column 12 Line 42)
Change "said-a" to --a--

Signed and Sealed this
Thirty-first Day of May, 2016

Michelle K. Lee
*Director of the United States Patent and Trademark Office*